United States Patent [19]
Avakian et al.

[11] Patent Number: 5,073,416
[45] Date of Patent: Dec. 17, 1991

[54] ARTICLES FROM MIXED SCRAP PLASTICS

[75] Inventors: Roger W. Avakian, Dalton; Shashi L. Parekh; Popkin Shenian, both of Pittsfield; Erich O. Teutsch, Richmond, all of Mass.

[73] Assignee: General Electric Company, Pittsfield, Mass.

[21] Appl. No.: 274,115

[22] Filed: Nov. 21, 1988

[51] Int. Cl.⁵ .................. B65D 71/00; B32B 5/06
[52] U.S. Cl. .................. 428/2; 428/412; 428/215; 428/283; 428/288; 428/297; 428/303; 156/62.2
[58] Field of Search ............ 428/2, 412, 215, 283, 428/288, 297, 303

[56] References Cited

U.S. PATENT DOCUMENTS

| | | |
|---|---|---|
| 3,716,449 | 2/1973 | Gatward et al. . |
| 4,013,613 | 3/1977 | Abolins et al. . |
| 4,097,446 | 6/1978 | Abolins et al. . |
| 4,410,602 | 10/1983 | Komoda et al. .......... 428/2 |
| 4,426,470 | 1/1984 | Wessling et al. . |
| 4,543,288 | 9/1985 | Radvan et al. . |
| 4,550,131 | 10/1985 | Yats . |
| 4,566,990 | 1/1986 | Liu et al. . |
| 4,595,620 | 6/1986 | Dighton et al. . |
| 4,596,670 | 6/1986 | Liu . |
| 4,596,736 | 6/1986 | Eichhorn et al. . |
| 4,643,940 | 2/1987 | Shaw et al. . |
| 4,659,412 | 4/1987 | Newman et al. . |
| 4,670,331 | 6/1987 | Radvan et al. . |
| 4,690,860 | 9/1987 | Radvan et al. . |
| 4,716,072 | 12/1987 | Kim . |

FOREIGN PATENT DOCUMENTS 1129757 10/1968 United Kingdom .
1329409 9/1973 United Kingdom .

Primary Examiner—P. C. Sluby
Attorney, Agent, or Firm—Hedman, Gibson, Costigan and Hoare

[57] ABSTRACT

Articles having acceptable levels of impact strength and physical integrity are provided from mixed scrap plastics by a wet dispersion process. Immiscible plastic particles are locked together by a network of chopped fibers to form a useful article derived from mixed scrap plastics.

16 Claims, No Drawings

ARTICLES FROM MIXED SCRAP PLASTICS

BACKGROUND OF THE INVENTION

1. Field of the Invention

The present invention relates to the recycle of mixed scrap plastics and more particularly relates to the production of useful articles from mixed scrap plastics.

2. Discussion of Related Art

The use of plastics has grown substantially in recent years and projected usage rates of plastics are expected to be even higher in the future as plastics find new uses and further replace conventional materials such as metals and glass. This increased plastic usage has resulted in a corresponding increased generation of plastic scrap from a variety of sources. Some of the plastic scrap has been reusable, for example, relatively pure polyester scrap from return deposit beverage containers has found some utility as a source for low grade, off-color, polyester, but most plastic scrap, for example, automotive scrap and household scrap, is mixed scrap plastic which has found little commercial utility and as a result has typically been disposed of as trash in landfills. Conventional wisdom has seen these mixed scrap plastics as essentially unusable as a raw material for the production of useful resinous articles because the mixed nature of the scrap plastics provides, upon melting of the scrap, immiscible blends which have little structural integrity, poor impact strengthes and poor flexural strengthes. These immiscible blends exhibit extensive phase separation and delamination during extrusion processing and would likely experience extensive decomposition if maintained at extrusion temperatures at typical extrusion conditions. Until the present invention, scrap plastics comprising mixed immiscible scrap plastics were seen by those in the art as having little utility in the production of useful resinous articles.

An object of the present invention is to produce useful articles from scrap plastics comprising mixed immiscible plastics.

SUMMARY OF THE INVENTION

It has now been found that mixed scrap plastics comprising plastics which are immiscible and exhibit phase separation in the melt can be made into useful articles exhibiting structural integrity and acceptable levels of important physical properties such as impact strength and flexural strength. The articles are produced from scrap plastics and comprise from 80 to 20% by weight of mixed scrap plastics and from 20 to 80% by weight of chopped fibers uniformly dispersed in the mixed plastics. The articles are produced by (a) sizing the mixed plastics into particulates having average diameter selected from between about 0.3 and about 0.8 millimeters; (b) forming an aqueous random dispersion of the fibers and particulates, the fibers being of an average length of at least 0.25 inches; (c) depositing the dispersion on a foraminous support to form a non-woven web of uniformly dispersed fibers and particulates, the depositing being accompanied by simultaneous drainage of water from the web through the support; (d) drying the web in a vacuum oven; and (e) compressing the web at a temperature above the melting point of at least 50% of the particulates to lock the particulates and fiber together so as to form an article having structural integrity and acceptable levels of impact strength and flexural strength upon subsequent cooling of the article.

DETAILED DESCRIPTION OF THE INVENTION

The present invention provides for thermoplastic articles derived from mixed scrap plastic. The articles comprise from 20 to 80% by weight of mixed plastics based on the total weight of the article and from 20 to 80% by weight of fibers having an average length of at least 0.25 inches.

The mixed scrap plastic may be obtained from any of a number of sources including for example automotive reclamation, household trash and trim from multilayer packaging production. Unmixed scrap plastic containing only one type of plastic, for example pure polyethylene scrap, is excluded from the definition of mixed scrap plastic. The household scrap plastic must comprise at least from 40 to 90% by weight of a first plastic and at least from 10 to 60% by weight of a second plastic based on the total weight of the mixed plastic, the first plastic and second plastic being immiscible in each other as illustrated by distinct phase separation during conventional extrusion processing. The first plastic is preferably selected from the group consisting of polyolefins such as polyethylene and polypropylene and mixtures thereof, and the second plastic is preferably selected from the group consisting of polycarbonate, acrylonitrile butadiene styrene, polyvinyl chloride, acrylic polymers, polyphenylene ether, polyamide, polystyrene, polyethyleneterephthalate and polybutyleneterephalate and mixtures thereof. The above specific sources of scrap are preferred for their ready availability in large quantities and are characterized as follows.

Household scrap comprises numerous disposable plastic consumer items such as food and beverage containers. More specifically, typical household scrap can be characterized as comprising from 40 to 90% by weight of polyethylene resins based on the total weight of mixed plastic; from 1 to 20% by weight of polystyrene resin based on the total weight of mixed plastic; and from 0.5 to 10% by weight of polyvinylchloride based on the total weight of mixed plastic.

Automotive scrap may be obtained from automotive salvage yards and typically includes such items as resinous bumpers, fenders, interiors, grills and optionally tires. The resultant mixed scrap plastic when ground into sufficiently small particles is characterized as comprising from 20 to 70% by weight polycarbonate resins based on the total weight of mixed plastics; from about 5 to 50% by weight poybutyleneterephthalate resins based on the total weight of mixed plastics, and from about 1 to 10 percent by weight polyurethane resins based on the total weight of mixed plastics. Up to 20% of the total weight of mixed plastics may be in the form of impact modifiers such as styrene-butadiene core shell impact modifiers, and thermosets such as thermoset polyesters, paints and adhesives.

The composition of multilayer packaging scrap depends on the materials used for each layer of the packaging. An example of packaging scrap obtained during the production of ketchup bottles can be characterized as comprising from 0 to 60 percent by weight polycarbonate resin based on he total weight of the mixed plastic; from 3 to 15% by weight of ethylene vinyl alcohol based on he total weight of mixed plastic; and from about 5 to 95% by weight of polypropylene scrap based on the total weight of mixed plastic. The remainder being resins from tie layers.

In broad terms the mixed scrap plastic may include amounts of polyesters, polycarbonates, polyarylene ether sulfones or ketones, polyamides, polyamide-imides, polyphenylene ether, polyetherimide, acrylonitrile butadiene styrene copolymers, polyolefins, and polystyrenes. Additionally, the mixed plastic may contain small weight percent, less than 5% by weight, of contaminates such as metal fragments and paper. Although the articles prepared from the mixed scraps may not have the levels of impact strength and flexural strength associated with pure resin, for example polycarbonate resin, the impact strengths and flexural strengths of the articles of the present invention are adequate for many uses such as the production of road signs, benches, doghouses and garden sheds.

The fibers employed in the articles of the present invention serve to interconnect otherwise immiscible particles. The fibers are preferably in the form of single discrete glass fibers and preferably have a length of from between 0.25 and 0.75 inches and have a diameter selected from between 2 and 25 microns. Other suitable fibers include organic and inorganic fibers such as carbon fibers, ceramic fibers and aramid fibers, polyester and other resinous fibers. Suitable glass fibers are commercially available. Shorter mineral fibers may be used in addition to longer glass fibers, e.g. processed mineral fibers.

The process of the present invention broadly involves (a) sizing the mixed plastics by grinding or chopping the plastics into particulates having an average diameter of between 0.3 and 0.8 millimeters, and generally having individual particulate diameters of between 0.1 and 2 millimeters, (b) forming an aqueous random dispersion of fibers and said particulates, the fibers having an average length of at least 0.25 inches, (c) depositing the dispersion on a foraminous support to form a nonwoven web of uniformly dispersed fibers and particulates, the depositing being accompanied by a simultaneous drainage of water from said web through said support, (d) drying the web in a vacuum oven, (e) compressing the web at a compression temperature above the melting point of substantial portion of the particulates to lock the unmelted particulates, fiber and melted plastic together to form an article having structural integrity following subsequent cooling thereof. Preferably the compression temperature is sufficiently high to melt at least 50 percent by weight of the mixed plastics, thus for example if 50 percent by weight based on the total weight of mixed plastics is polyethylene then the compression temperature should be at least about the melting temperature of polyethylene. Preferably, less than 50 percent of the particulates remain unmelted. Preferably the compression temperature is selected from between 280° F. and 600° F., and more preferably between 400° F. and 450° F. The compression pressure is preferably at least 10 pounds per square inch (psi), and more preferably between 30 psi and 300 psi. Preferably the article is compressed for a period of less than about 10 minutes and more preferably for a period of time between 1 and 2 minutes.

Numerous known techniques may be used for the production of the web via an aqueous random dispersion. Thus, a web of fibers and plastic particulates or powder may be produced by the process described in U.K. Pat. Nos. 1129757 and 1329409 and U.S. Pat. No. 3,716,449 after which the web may be immediately consolidated into a useful means of a hot press. Any wet process which achieves random dispersion of fibers and particulates in a resultant web or sheet is suitable. Preferably a foam dispersion process is employed as set out in U.S. Pat. No. 3,716,449. The process employed must achieve a uniform and random dispersion of the particulates and fibers without experiencing high shear in the melt.

Failure to achieve random and uniform dispersion of the particulates and fibers will result in articles that lack uniformity and which have portions that lack the desired levels of physical integrity, impact strength or flexural strength.

Conventional high shear extrusion processes are unacceptable in that they, due to their high shear, reduce average fiber lengthes to below the desired 0.25 inches, thereby producing articles that lack the necessary levels of physical properties. Additionally, the extrusion processes, due to their high shear in the melt, cause immisible plastics to group into separate and distinct phases which delaminate upon subsequent cooling rather than exist as a finely interlocked dispersion in the end article. The present process does not expose the plastic to shear in the melt but rather exposes the melt only to static compressive forces. The preferred dispersion process for web formations is set forth in U.S. Pat. No. 3,716,449 which is incorporated herein by reference, and the process is described as follows.

Fibers to be formed into a web are dispersed in foamed surfactant-containing water which has been brought to a state of extreme emulsification of air therein. A thick, viscous emulsion is formed by dispersing air in an aqueous solution of an emulsifying agent in the form of bubbles, so small that even the largest is barely visible to the naked eye. The number average bubble diameter, as determined in the manner described in U.S. Pat. No. 3,716,449, should be no greater than about 0.2 mm. The foam should contain at least 65 percent of air or, in other words, the specific gravity of the foam should not be greater than 0.35. Moreover, the viscosity of the foam emulsion should not be less than 22 seconds as measured at 20° C. using Ford Cup Type B-4 in the manner called for by British Standard 1733.

Vortical foam production is employed so as to cause maximum emulsification as minute bubbles occur at the base of a vortex while coarser bubbles tend to rise and accumulate at the surface in equilibrium with the vorticle forces which tend to suck them down into the vortex with air so as to become further emulsified into minute bubbles. The vortical foaming action is continued until the desired emulsification of air is attained in the region adjacent the base of the vortex from which the foam is taken for deposit on the web-forming foraminous surface of the web-forming machine. During the formation of the foam the fibers to be formed into the web are dispersed in the foam so as to present in the highly emulsified foam taken to the headbox of the web-forming machine.

Employment of a foamed fibrous furnish may be carried out in the commercial production of non-woven webs and in affording means in combination with conventional paper-making equipment whereby responsive to simple selective manipulation a non-woven web may be produced either in the conventional way or when employing a foamed furnish.

It has been found that when fibers are dispersed in a liquid medium of the kind specified in the above summary the medium possesses thixotropic-pseudoplastic properties in that it combines the advantages of high viscosity under low stresses such as occur when the fibers cease the motion imparted thereby by the dispersion machinery, with low viscosity and an acceptably fast rate of drainage when subject to pressure against a supporting wire during the drainage and formation of a fibrous web on a usual paper-making machine. Fibers dispersed in such a liquid medium quickly become immobile when agitation ceases and remain well dispersed to form a substantially uniform web. Materials formed in this manner have very uniform distribution of fibers over their area, even if the fibers are long or liable to clump and flocculate together. The suspension of fibers in an emulsion of air can be obtained at a consistency, that is a ratio of fiber to liquid, substantially higher than is practicable with other known methods. The deposition and drainage of the suspensions in order to form a fibrous web may be accomplished using currently available paper-making machinery with only slight modifications. Alternatively, new machinery can be constructed to form fibrous webs from the suspension, which machinery is substantially more simple in design and operation than is conventional paper-making machinery.

When preparing the thixotropic-pseudoplastic liquid medium the chemical nature of the emulsifying agent used is found not to be critical provided that it has an emulsifying power sufficient to produce a thick, viscous emulsion of very small air bubbles. The emulsifying agent may be anionic, cationic, or non-ionic and it has been found that proprietary surface active agents such as that sold under the name "ACE" liquid, this being an anionic substance, by Industrial Soaps Ltd., that sold as "TEXOFOR FN 15", a non-ionic substance, by glover Chemicals Ltd., and that sold as "AMINE Fb 19," a cationic substance, by Float-Ore Ltd., are all suitable for making the required viscous emulsion. Another non-ionic emulsifying agent that has been used is octyl-phenoxypolyethoxy ethanol. One of the most useful emulsifying agents is commercial grade dodecyl benzene sulfonate. Soap flakes may also be used. It is, however, to be understood that the emulsifying agent used may depend on the properties which it may impart to a finished fibrous material. The emulsifying agent is mixed with water and the use of hot water may be an advantage in preparing the emulsion but hot water is not essential.

The emulsion may be prepared in any suitable kind of emulsifying apparatus subject to the provision that the apparatus is capable of emulsifying air in the form of very small bubbles, the largest of which is barely visible to the naked eye, in the liquid and of maintaining this dispersion. In general, simply stirring the liquid does not produce a sufficiently vigorous emulsifying action. Thus, while it was possible to incorporate 65 percent or more of air in a dilute dispersion of fibers in surfactant-containing water when using a conventional blender type mixer, the resulting foam fell considerably short of attaining the aforesaid minute bubble size or a viscosity of at least 22 seconds or failed to attain either and the web formed from the foamed furnish was inferior to a web formed from a corresponding fiber dispersion when the aforesaid properties were attained. Machines which provide high rates of vortical mixing are required. It has been found that a modified froth flotation cell of the type made by Denver Equipment Co., Denver, Colo., provides a suitable emulsifying action. Effective vortical mixing utilizing such foam-producing means is described more in detail hereinbelow.

It is essential that the concentration of the emulsifying agent be sufficiently high and that the action of the emulsifying apparatus to be sufficiently vigorous to produce a finely dispersed emulsion of air in water. It will be understood that if the concentration of the emulsifying agent is too low only a thin fluid emulsion will be obtained which will soon separate into a liquid layer and a coarse froth, and that if the concentration is sufficiently high but the emulsifying action of the apparatus is insufficiently vigorous a thick, viscous emulsion may not form at all. It will further be understood that it is necessary to control the amount of air dispersed in the emulsion because if too much air is folded in the emulsion will turn into a dry, coarse froth with large bubbles and will not be suitable for making a uniform dispersion of fibers. A satisfactory emulsion is one which has a viscosity greater than 22 seconds, when measured by Ford Cup Type B-4 according to British Standard 1733, and the air content of the foam is not less than 65 percent by volume, that is, the foam has a specific gravity not greater than 0.35, provided that the largest bubble is barely visible to the naked eye. When reference is made herein and in the claims to the viscosity being at least 22 seconds (measured in the manner aforesaid) the reference is to the viscosity of foam produced in the absence of the fibers, but under conditions corresponding precisely with the conditions that prevail when producing the foamed furnish, the reason being that the presence of the fibers interferes with obtaining an accurate measurement of viscosity.

It is possible to disperse fibers in the liquid medium concurrently with the formation of the emulsion, or alternatively to insert the fibers, either dry or as a suspension of fibers in water, into the prepared, i.e., foamed, liquid medium and effect dispersion in the same apparatus as is used to prepare the liquid medium. The preferred method of effecting dispersion of fibers in the liquid emulsion is to transfer the prepared liquid medium from the apparatus in which it is prepared to another apparatus and there to add to it and to disperse in it a suspension of fibers in a small quantity of water.

The prepared, substantially uniform, suspension of fibers flows or is pumped to and deposited as a layer on the moving wire of a Fourdriner type paper-making machine, or the surface of a cylinder type board machine, or the web-forming area of other suitable forms of apparatus known in the art of paper making. Upon the application of suction to the other side of the wire the layer of emulsion collapses and drains, leaving on the surface of the wire a web of fibers of a superior degree of uniformity. While spreading of the suspension of fibers on the wire and the collapsing and draining of the resulting layer of emulsion can be effected by any of the methods known in the art, the spreading is preferably effected by the use of an enclosed flow spreader of relatively low volume, for example, of the kind described in British Pat. No. 1,075,103, and is then collapsed by means of suction applied to the underside of the wire, after which the formed web is handled as in a usual paper-making process.

Surfactant-containing water drained from the foam during formation on the foraminous support of the web-forming machine is effectively reutilized and at least a part thereof is returned directly to the foam-producing means, for example, so as to be introduced adjacent the mouth of the vortex of a vortical foam-producing unit, and in order to control the consistency of the foamed fibers furnish its introduction may be permitted by a sensing device that is responsive to liquid level in the foam-producing means. Fiber may be introduced separately either dry or in the form of a thickened slurry. When introduced in the form of a thickened slurry, the fresh water content of the slurry is controlled in balanced relation to the water content of the web as it is removed from the web-forming machine. Part of the drained water may be mixed with edge trim or other fibers and separately introduced into the foam-producing means. Erratic pumping action occasioned by the presence of foam in the surfactant-containing water is successfully overcome preferably by the employment of a positive displacement pump whose capacity preferably is greatly increased in a novel way by sucking additional liquid into a jet stream of the output of said pump.

Multilayer sheets may be formed without difficulty. Several layers of fibrous suspension may be collapsed and drained consecutively upon an already formed mat, that is, by using several headboxes suspended above and along part of the length of the wire. The position of each headbox would coincide with a bank of suction boxes positioned on the underside of the wire. In the normal paper-making process, where the fibers are dispersed in water this would necesitate large quantities of water from the second and successive headboxes being drained through the previously formed mats, resulting in poor formation. In the process according to the invention little liquid has to be drained through the previously formed mats and collapsing and draining of the emulsion does not unduly disturb the formation. Because of the high viscosity of the foamed suspension its drainage may be accelerated at a more controlled rate, namely, on a larger number of suction boxes, without the disadvantage of the stock flocculating.

Following production of the web, the web is dried in a vacuum oven to remove excess moisture therefrom. The dried web is then compressed at an elevated temperature to force a substantial portion of the mixed plastic to flow around adjacent fibers and particulates thereby locking the fibers, unmelted particulates and melted plastic into an integral structure. Amounts of binders, for example water soluble polymers or latex, may be employed in formation of the structures prior to consolidation, although the use of such binders is not necessary for the formation of useful structures. The surface characteristics of the article will depend in large part upon the particular mixed scrap plastics employed. The resultant surface will be comprised of different types of plastics some of which may be unsuitable for subsequent paint adhesion or contact with foods, may degrade upon contact, aggressive solvents or sunlight, or may unduly absorb water. Thus, while the articles produced from the mixed scrap plastics will have acceptable levels of structural integrity, impact strength and flexural strength, the relevant article may not have the surface characteristics required for the desired end use. For examples road signs made from the articles in the form of compressed sheets will need to be painted on one surface and thus that surface must permit paint adherence thereto. The articles in the form of sheets may also be used as panels for outdoor structures such as garden sheds and thus must be resistant to degradation from extensive exposure to moisture and ultraviolet radiation from sun light. Thus, in order to provide articles with desired surface characteristics the present invention also involves multilayered articles wherein the aforementioned fiber/mixed plastic article is employed as an inner layer disposed between a protective resinous first outer layer and a protective resinous second outer layer. Depending on the end use of the multilayered article, it may be necessary to employ only one protective outer layer. The first outer layer and second outer layer may be independently selected from polyethylene, polypropylene, polycarbonate, polyvinylchloride, polyethyleneterephthalate, polybutyleneterephthalate and polyamide resins. The resin used as the outer layers will depend on the desired surface characteristics of the multilayered article. The outerlayers are preferably of a thickness selected from between 1 mil and 30 mils and the inner layer is preferably of a thickness of between 30 mils and 1000 mils. The outer layers may be adhered to the inner layer by the employ of suitable tie layers such as ethylene vinyl alcohol. Alternatively the outer layers may be adhered directly to the inner layer by laminating the layers together at a temperature sufficiently high to cause the contacting surfaces of the inner and outerlayers to soften and fuse together thereby forming a bond between the layers upon subsequent cooling of the multilayered article. Alternatively the desired end product surface characteristics may be obtained by applying an outer layer of liquid thermosetting resin to the surface of the inner layer and then curing the thermosetting resin thereon to forming a multilayered article having a resinous outerlayer with the desired physical characteristics.

What is claimed:

1. An article produced from mixed scrap plastic, said article comprising:
   (a) from 20% to 80% by weight of mixed scrap plastic based on the total weight of said article, said mixed scrap plastic comprising (i) from 20% to 70% by weight of a polycarbonate resin based on the total weight of said mixed scrap plastic, (ii) from 5% to 50% by weight of polybutyleneterephthalate resin based on the total weight of said mixed scrap plastic, and (iii) from 1% to 10% by weight of polyurethane based on the total weight of said mixed scrap plastic; and
   (b) from 20% to 80% by weight of chopped glass fibers based on the total weight of said article, said fibers having an average length of at least 0.25 inches.

2. A multilayered article produced from mixed scrap plastic, said multilayered article comprising:
   (a) a resinous first outer layer;
   (b) an inner layer having:
      (i) from 20% to 80% by weight of mixed scrap plastic based on the total weight of said article, said mixed scrap plastic comprising:
         (a) from 20% to 70% by weight of a polycarbonate resin based on the total weight of said mixed scrap plastic,
         (b) from 5% to 50% by weight of polybutyleneterephthalate resin based on the total weight of said mixed scrap plastic, and
         (c) from 1% to 10% by weight of polyurethane based on the total weight of mixed scrap plastics; and
      (ii) from 20% to 80% by weight of chopped glass fibers based on the total weight of said article, said fibers having an average length of at least 0.25 inches; and
   (c) a resinous second outer layer, said inner layer being disposed between said first and second outer layers.

3. The multilayered article of claim 2 wherein said first outer layer and said second outer layer are independently selected from the group consisting of a polyethylene resin, a polypropylene resin, a polycarbonate resin, a polyethyleneterephthalate resin and a polybutyleneterephthalate resin.

4. An article produced from mixed scrap plastic, said article comprising:
   (a) from 20% to 80% by weight of mixed scrap plastic based on the total weight of said article, said mixed scrap plastic having:
      (i) from 40% to 90% by weight of a first plastic based on the total weight of said mixed scrap plastic, said first plastic being selected from the group consisting of polyolefins;
      (ii) from 60% to 10% by weight of a second plastic based on the total weight of said mixed scrap plastic, said second plastic being selected from the group consisting of polycarbonate, acrylonitrile butadiene styrene, polyvinyl chloride, acrylic polymers, polyphenylene ether, polyamide, polystyrene, polyethyleneterephthalate and polybutyleneterephthalate; and
   (b) from 20% to 80 by weight of chopped glass fibers based on the total weight of said article, said fibers having an average length of at least 0.25 inches, said fibers being randomly dispersed within said mixed scrap plastic of said article.

5. The article of claim 4 wherein said first plastic is polyethylene.

6. An article produced from mixed scrap plastic, said article comprising:
   (a) from 20 to 80% by weight of a mixed scrap plastic based on the total weight of said article; said mixed scrap plastic being
      (i) from 40 to 90% by weight of a polyethylene resin based on the total weight of said mixed scrap plastic
      (ii) from 1 to 20% by weight of a polystyrene resin based on the total weight of said mixed scrap plastic and
      (iii) from 0.5 to 10% by weight of a polyvinyl chloride resin based on the total weight of said mixed scrap plastic; and
   (b) from 20 to 80% by weight of fibers randomly dispersed in said mixed scrap plastics, said fibers having an average length of at least 0.25 inches.

7. The article of claim 6 wherein said fibers are chopped glass fibers having an average length selected from between 0.25 inches and 0.75 inches.

8. A multilayered article produced from mixed scrap plastic, said article comprising: a resinous first outer layer; and an inner layer comprising:
   (a) from 20% to 80% by weight of mixed scrap plastic based on the total weight of said article, said mixed scrap plastic having:
      (i) from 40% to 90% by weight of a first plastic based on the total weight of said mixed scrap plastic, said first plastic being selected from the group consisting of polyolefins;
      (ii) from 60% to 10% by weight of a second plastic based on the total weight of said mixed scrap plastic, said second plastic being selected from the group consisting of polycarbonate, acrylonitrile butadiene styrene, polyvinyl chloride, acrylic polymers, polyphenylene ether, polyamide, polystyrene, polyethyleneterephthalate and polybutyleneterephthalate; and
   (b) from 20% to 80% by weight of chopped glass fibers based on the total weight of said article, said fibers having an average length of at least 0.25 inches, said fibers being randomly dispersed within said mixed scrap plastic of said article; and a resinous second outerlayer, said inner layer being diposed between said first and second outer layers.

9. The article of claim 8 wherein said first and second layer are independently selected from the group consisting of polyethylene resin; polypropylene resin, polycarbonate resin, polyethyleneterephthalate resin, polybutylene terephthalate resin, and polystyrene resin.

10. The article of claim 9 wherein said first and second outer layers have thicknesses independently selected from between 1 and 30 mils, said inner layer has an average thickness selected from between 30 and 1000 mils.

11. The article of claim 8 wherein said first plastic is polyethylene.

12. An article produced from mixed scrap plastic, said article comprising:
   (a) from 20 to 80% by weight of a mixed scrap plastic based on the total weight of said article, said mixed scrap plastic comprising (i) from 5 to 60% by weight of polycarbonate based on the total weight of mixed scrap plastic (ii) from 5 to 15% by weight of ethylene vinyl alcohol based on the total weight of mixed scrap plastic and (iii) from 5 to 60% by weight of polypropylene resin based on the total weight of mixed scrap plastic; and
   (b) from 80 to 20% by weight of fibers based on the total weight of said article, said fibers being dispersed in said mixed scrap plastic, said fibers having an average length of at least 0.25 inches.

13. The article of claim 12 wherein said fibers are glass fibers.

14. A multilayered article produced from mixed scrap plastic, said article comprising:
   (a) a resinous first outerlayer;
   (b) a resinous second outerlayer; and
   (c) an inner layer, said inner layer having;
      (i) from 20 to 80% by weight of a mixed scrap plastic based on the total weight of said inner layer, said mixed scrap plastic comprising
         (A) from 0 to 60% by weight of polycarbonate based on the total weight of mixed scrap plastic
         (B) from 3 to 15% by weight of ethylene vinyl alcohol based on the total weight of mixed scrap plastic; and
         (C) from 5 to 85% by weight of polypropylene resin based on the total weight of mixed scrap plastic; and
      (ii) from 20 to 80% by weight of fibers based on the total weight of said article, said fibers being dispersed in said mixed scrap plastic, said fibers having an average length of at least 0.25 inches; and a resinous second outerlayer, said inner layer being disposed between said first and second outer layers.

15. The multilayered article of claim 14 wherein said first and second outer layers have thicknesses independently selected from between 1 and 30 mils, said inner layer has an average thickness selected from between 30 and 1000 mils.

16. The multilayered articles of claim 14 wherein said fibers are selected from the group consisting of glass fibers, metal fibers and plastic fibers.

* * * * *